United States Patent
Haussman

(10) Patent No.: US 9,502,700 B2
(45) Date of Patent: Nov. 22, 2016

(54) POWER TRAIN BATTERY ASSEMBLY OF AN ELECTRIC, FUEL-CELL OR HYBRID VEHICLE

(75) Inventor: Roland Haussman, Wiesloch (DE)

(73) Assignee: VALEO KLIMASYSTEME GmbH, Bad Rodach (DE)

( * ) Notice: Subject to any disclaimer, the term of this patent is extended or adjusted under 35 U.S.C. 154(b) by 1950 days.

(21) Appl. No.: 12/115,948

(22) Filed: May 6, 2008

(65) Prior Publication Data

US 2008/0305388 A1    Dec. 11, 2008

(30) Foreign Application Priority Data

May 7, 2007  (DE) .................. 10 2007 021 309

(51) Int. Cl.
| | | |
|---|---|---|
| H01M 10/613 | (2014.01) | |
| H01M 2/10 | (2006.01) | |
| H01M 6/46 | (2006.01) | |
| H01M 10/625 | (2014.01) | |
| H01M 10/6557 | (2014.01) | |
| H01M 10/6567 | (2014.01) | |
| H01M 10/6555 | (2014.01) | |
| H01M 10/643 | (2014.01) | |
| F28D 15/00 | (2006.01) | |
| F28F 1/22 | (2006.01) | |

(52) U.S. Cl.
CPC .......... *H01M 2/105* (2013.01); *H01M 2/1077* (2013.01); *H01M 6/46* (2013.01); *H01M 10/613* (2015.04); *H01M 10/625* (2015.04); *H01M 10/643* (2015.04); *H01M 10/6555* (2015.04); *H01M 10/6557* (2015.04); *H01M 10/6567* (2015.04); *F28D 15/00* (2013.01); *F28F 1/22* (2013.01)

(58) Field of Classification Search
CPC .................. H01M 10/6556; H01M 10/6557; H01M 10/613
USPC ........................................... 429/120
See application file for complete search history.

(56) References Cited

U.S. PATENT DOCUMENTS 5,301,141 A * 4/1994 Traylor ................. 365/49.1
5,310,141 A * 5/1994 Homer et al. ........... 244/158.1
(Continued)

FOREIGN PATENT DOCUMENTS

DE    19536115 A1    4/1997
DE    103 52 046 A1 * 11/2003 ............ H01M 10/50
(Continued)

OTHER PUBLICATIONS

Machine translation of DE 103 52 046 A1.*
(Continued)

*Primary Examiner* — Maria J Laios
(74) *Attorney, Agent, or Firm* — Howard & Howard Attorneys PLLC

(57) ABSTRACT

A power train battery assembly of an electric, fuel-cell or hybrid vehicle, said assembly having a plurality of battery cells (16), each encased in an individual and externally-closed cell housing (18), that are combined into a cell stack and moreover having at least one pipe (36) conducting cooling fluid for the removal of heat energy from the battery cells (16). At least one heat-conducting fin (42) that originates from the pipe (36) flatly abuts, at least in sections, at least one cell housing (18).

26 Claims, 15 Drawing Sheets

(56) References Cited

U.S. PATENT DOCUMENTS

Figure 4:
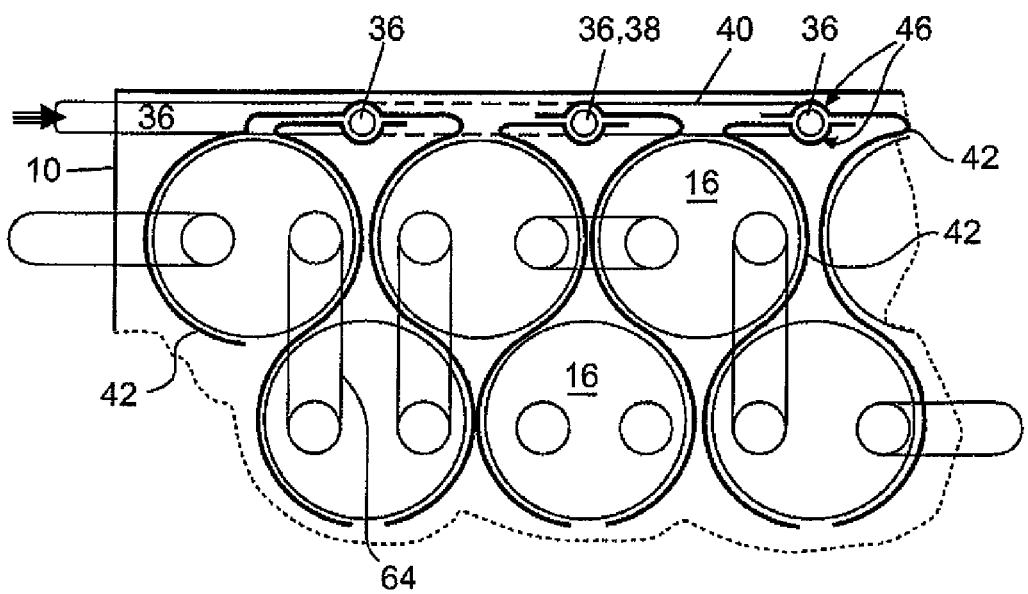

| | | | | |
|---|---|---|---|---|
| 5,356,735 A | * | 10/1994 | Meadows | H01M 2/0242 |
| | | | | 429/120 |
| 5,639,571 A | * | 6/1997 | Waters | B60L 11/1874 |
| | | | | 180/68.5 |
| 5,927,396 A | | 7/1999 | Damsohn et al. | |
| 6,537,694 B1 | * | 3/2003 | Sugiura | H01M 2/1022 |
| | | | | 429/120 |
| 2003/0017383 A1 | * | 1/2003 | Ura et al. | 429/120 |
| 2006/0073378 A1 | * | 4/2006 | Hamery et al. | 429/120 |
| 2007/0018610 A1 | * | 1/2007 | Wegner | H01M 2/0212 |
| | | | | 320/112 |

FOREIGN PATENT DOCUMENTS

| | | |
|---|---|---|
| JP | 3093172 A | 4/1991 |
| JP | 2006185788 A | 7/2006 |

OTHER PUBLICATIONS

English language abstract for DE 19536115 extracted from espacenet.com, Jul. 11, 2008.

English language abstract for JP 3093172 extracted from espacenet.com, Jul. 11, 2008.

English language translation and abstract for JP 2006-185788 extracted from Searching PAJ, Jul. 11, 2008, 37 pages.

* cited by examiner

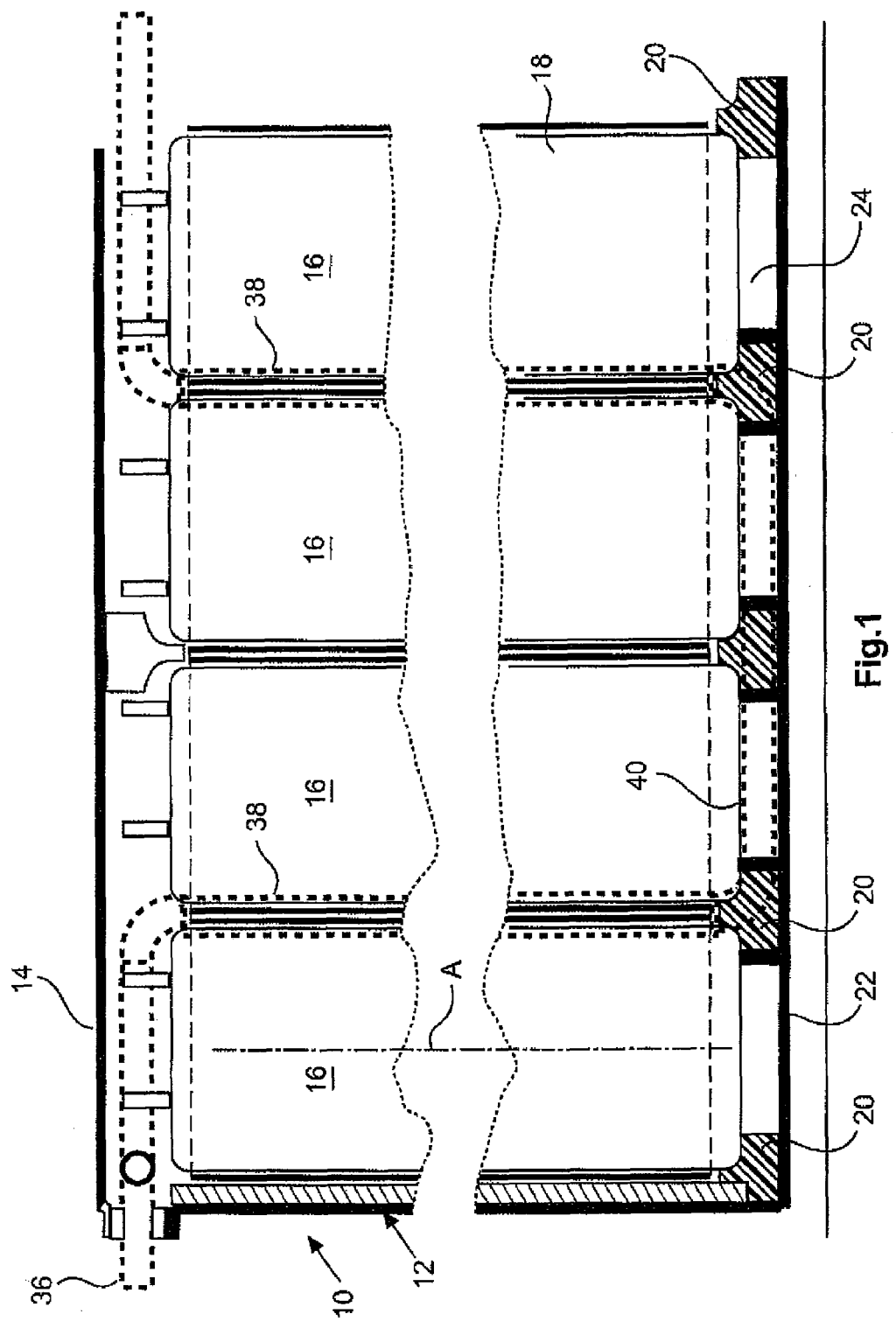

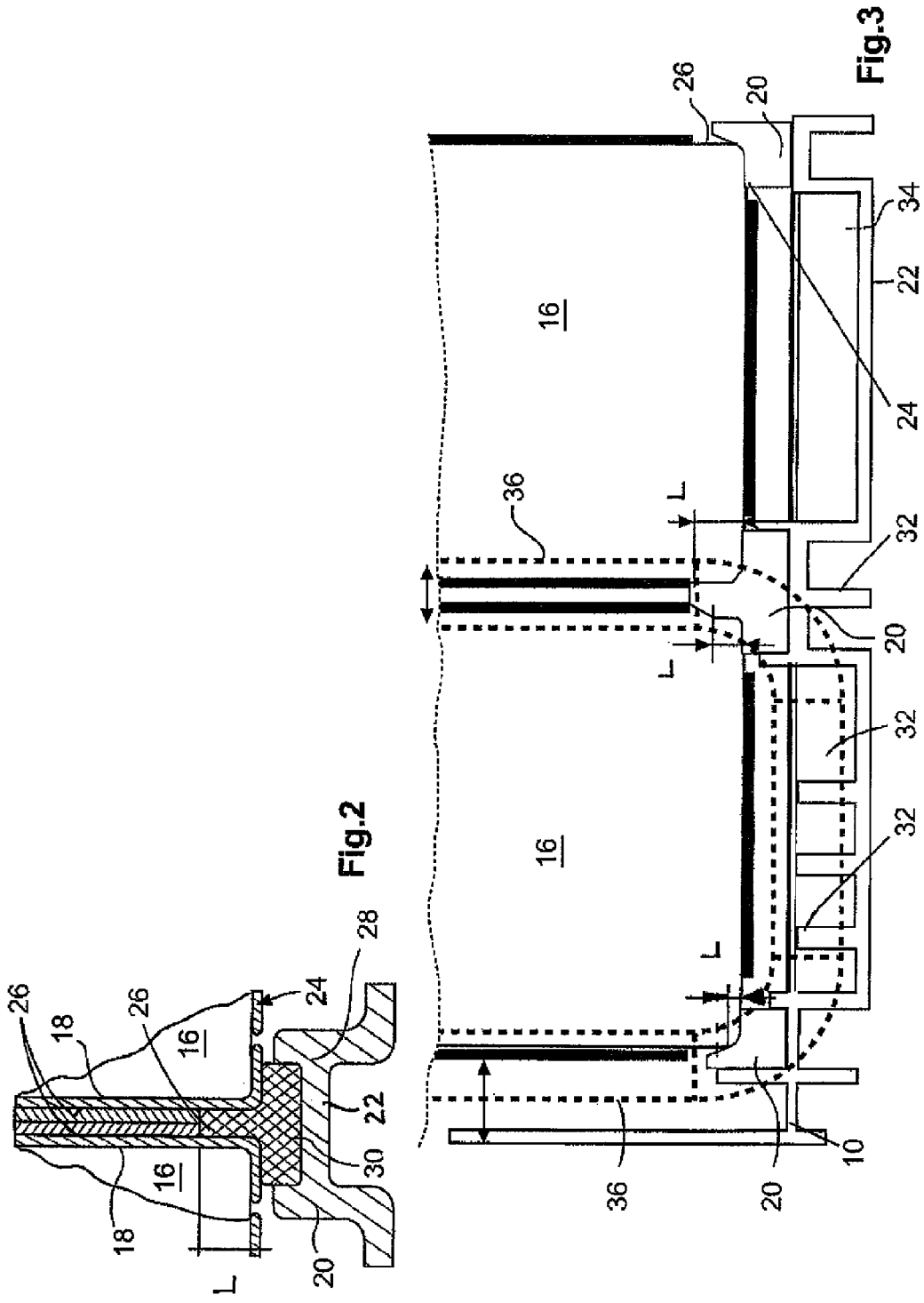

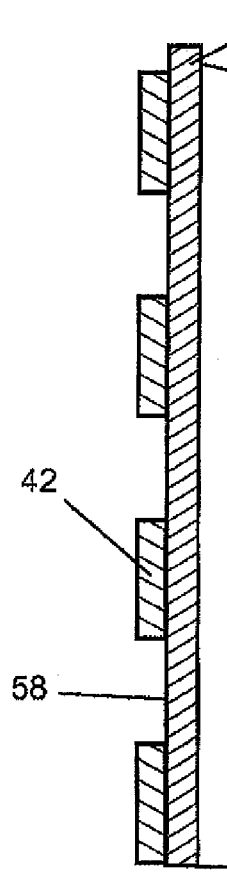
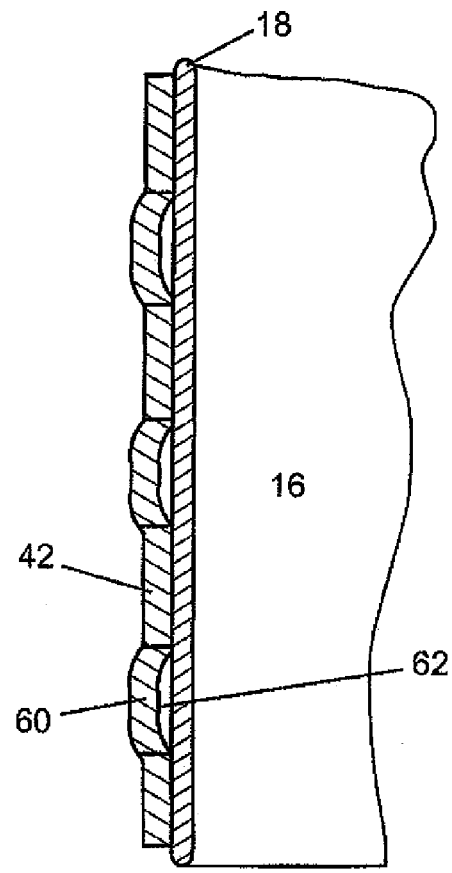
Fig.24    Fig.25
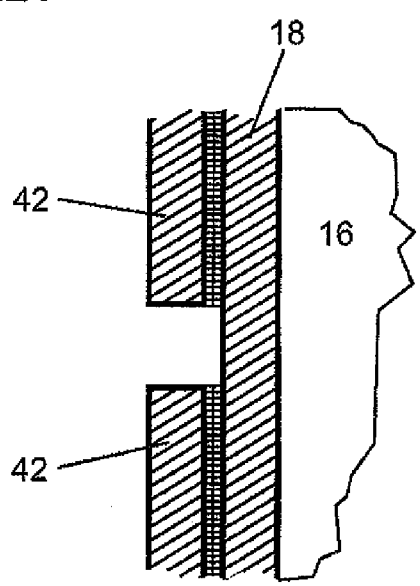
Fig.26

POWER TRAIN BATTERY ASSEMBLY OF AN ELECTRIC, FUEL-CELL OR HYBRID VEHICLE

RELATED APPLICATIONS

This application claims priority to and all the advantages of German Patent Application No. DE 10 2007 021 309.5, filed on May 7, 2007.

The invention relates to a power train battery assembly of an electric, fuel-cell or hybrid vehicle, said assembly having a plurality of battery cells, each encased in an externally-closed cell housing, that are combined into a cell stack and moreover having at least one pipe conducting cooling fluid for the removal of heat energy from the battery cells.

Because pure internal combustion engines adversely affect the environment owing to $CO_2$ pollution, electric power trains for vehicles transporting passengers or goods are being increasingly developed and are at least partially replacing internal combustion engines. The present invention concerns such power train battery assemblies for electric, fuel-cell or hybrid vehicles. In such power train battery assemblies, prefabricated, externally-closed battery cells are joined with a high-voltage battery (customary voltages of 130 volts for the so-called "mild" hybrids and 360 volts for a "full" hybrid) and combined in a joint outer housing. The battery cells are manufactured separately from each other, each possess an individual metal outer housing whose exterior is coated in plastic to ensure electrical insulation. The battery cells are conventionally NiMh- or Li-ion battery cells that generate heat during the charging and discharging process. However, these battery cells should not exceed their maximal cell temperature of 55° C. to 80° C. which could limit the lifetime of the battery. An inhomogeneous temperature distribution between the cells can also reduce battery cell life and thus the life of the entire assembly. It is therefore important to ensure that the temperatures between the cells does not differ by more than ±2 to 5 K, preferably by only ±2 to 3 K. Since the cells are electrically connected in series, one defective cell can lead to the complete failure of the entire battery assembly. Considerations have already been made regarding how to maintain the battery assembly at a constant temperature by means of an active fluid cooling system. Examples of this are DE 195 36 115 A1, whose subject matter is a heat exchanger designed in the form of a plate stack; JP 2006 185 788 A2, which shows a very complicated air-cooling system having controlled air-flow diversion vanes; and JP 30 93 172 A2, which envisions a plurality of heat exchangers between individual cells that nevertheless could lead to space concerns.

The invention presents a simple, space-saving, actively-cooled power train battery assembly that can be manufactured at a reasonable cost. The invention guarantees a battery-assembly life span of ten years or more.

The invention furthermore is intended to ensure that the energy amounts, which accumulate to some extent, are to be carried away, and range from 300 to 1,500 watts, are effectively removed without the volume of the power train battery assembly being thereby increased.

This is achieved in the power train battery assembly of the initially-mentioned type by means of at least one heat-conducting fin originating from the pipe that at least in portions lies flat against at least one cell housing. The invention moreover describes thin fins that originate from the pipe and that provide a solid thermal bridge between the individual battery cells and the one pipe or plurality thereof. Such fins are very thin and therefore conserve space, permit a rapid heat transfer, and are easy to manufacture. Moreover, because the fins have a minimal wall thickness, they can easily be adjusted to the external geometry of the cell housing in such a manner that they are extensively flatly applied there against.

The fin is thus at least in portions brought into line with the outer housing of the battery cell in order to rapidly transport heat away therefrom and toward the pipe.

An additional advantage of the invention is that without altering the concept, the assembly can operate with different cooling media. For example, a water/glycol mixture, R134a, $CO_2$ or another cooling agent can be used. The weight of the power train battery assembly according to the invention is less than that disclosed in the prior art in which, inter alia, numerous heat exchangers are embedded in the battery assembly. The fins can also be conducted around the individual cells ensuring heat transfer from locations difficult to access and having space issues. There is also a plurality of possibilities for guiding the arrangement of the pipe through the assembly. The pipe sections or the plurality of pipe lines need not be arranged immediately next to the individual battery cells to ensure a uniform heat distribution across the battery pack.

With regard to piping, metal pipes having a thermal conductivity of >40 W/m/K, aluminum pipes in particular, are customarily used.

The pipes customarily have an outer diameter of only 4 to 10 mm.

The pipe wall thickness is customarily between 0.3 and 2 mm. As mentioned, it is of course possible to provide a plurality of pipes that can be connected in series or parallel. The pipes can be connected to an inlet collector and an outlet collector from which the pipes originate or into which they lead.

As fins, thin sheet metals, in particular composed of aluminum, copper or another very heat-conductive material, are used that, according to the preferred embodiment, exhibit a thermal conductivity of 60 W/m/K to 400 W/m/K.

The thickness of the fins is between 0.1 and 2.5 mm, preferably between 0.5 and 1.5 mm.

As has been determined, the optimal inner diameter of the pipes is between 3 to 6 mm with a wall thickness of 0.3 to 1 mm when water or R134 is used as a cooling agent, and 1.5 to 4 mm with a wall thickness of 1 to 2 mm when $CO_2$ is used as a cooling agent.

Customarily, a plurality of fins are provided on one pipe, said fins being distributed about the circumference of the pipe and partially enclosing one or more battery cells in order to cool them. Up to ten battery cells are sufficiently cooled by means of one pipe, and one fin is assigned to up to three battery cells.

It is possible for one fin to originate from a plurality of pipes, that is, for example, with its two opposing edges being attached to different pipes.

According to the preferred embodiment, the fin presses against the cell housing. It should therefore be impossible for an air gap to form between the fin and the outer housing and the heat exchange to be reduced. An additional advantage of the prestressing consists in making it possible to collect the allowable variations of the outer housing of the battery cells. The outer housings do not all have technically the exact same outer diameter but rather variations within a tolerance that is captured by a precise prestressing of the fins. To this end, the position and geometry of the fin is coordinated to the minutest dimensions of a battery cell. This ensures that even in the instance of a battery cell on the lower limit of the allowable variation, the fin is always securely applied against the cell housing.

In this connection, it is advantageous if the fin hugs the shape of at least one cell housing by means of a press fit on the outer diameter of said cell housing, that is to say it substantially adopts the shape of the outer housing. The thin-walled fin is also particularly suited for this purpose.

Should the fin run so extensively around the battery cell so as to be fixed thereto in a self-locking manner, a form-fitting positioning of the fin to the associated battery cell or cells is possible without additional means.

The heat exchange between the fin and the pipe is also important. The solution provides for the fin to enclose or encompass the pipe in sections in order for an extensive heat exchange to be possible at that location.

The fastening of the fin to the pipe can be effected by means of adhesive bonding, welding, soldering or a mechanical fastening means, the fin preferably being affixed directly to the pipe to create immediate heat exchange.

Similar to the battery cell, in order for the fin to be fastened to the pipe, it can encompass the pipe partially by forming a press fit or it can completely encompass the pipe.

The battery cells are customarily elongate bodies, in particular cylindrical bodies such as circularly cylindrical bodies or a rectangular parallelepiped, that is to say bodies with a longitudinal axis. From the perspective from the direction of the longitudinal axis, the fin should contact more than 90° of the circumference when abutting the battery housing in order to ensure a sufficiently large heat-exchange surface.

At least 40% of the surface of the outer circumference of the cell housing should abut the fin, as is provided for in the embodiment.

The battery cell or cells can be clamped between a plurality of fins that engage opposed sections of the outer circumference of the cell housing, said fins also possibly being allocated to a plurality of pipes or pipe sections. The previously mentioned complete contact surfaces can accordingly be made up of a plurality of individual contact surfaces of different fins on the same battery cell.

In precisely the design of the cell housing having a cylindrical or circular cylindrical form, the fins can be fitted in a space-saving manner if they extend through the cell stack in a concertina arrangement or, in rectangular parallelepiped cell housings in a crenellation arrangement on cells in differing rows.

It is advantageous if fin sections or fins of adjacent cells do not come into contact with each other in order to provide the fins with sufficient latitude as this is important to the tolerance compensation.

The invention moreover develops a battery assembly with a plurality of battery cells, of which each is externally closed by its own cell housing, as well as at least one pipe which conducts cooling fluid and is laterally flattened in the region of an adjacent cell. This makes it possible to place the pipe in the space between the adjacent battery cells without cross-sectional restrictions, while flattening critical installation-space regions in order to reduce the overall dimensions of the power train battery assembly.

The pipe is preferably provided upstream and downstream of the flattened regions and has a circularly cylindrical cross section.

As already mentioned, the pipe runs especially in concertina or crenellation arrangement through the cell stack. For this purpose, the pipe has at least one section that runs alongside the longitudinal axis of the cells and at least one section that runs transversely to the longitudinal axis of the cells, the transversely-running section preferably comprising the partially flattened section.

In circularly cylindrical cell housings, the pipe extends at least partially into the envelopes of adjacent cells, the flattened and transversely-running section being positioned outside the envelopes. The envelope is a theoretically geometrical structure that is wrapped around the cell stack like tightly stretched fabric.

The area of the pipe to which the cells are attached can be located on the outer edge of the cell stack or within the cell stack in the empty space between the adjacent battery cells. The arrangement outside the pipe is advantageous because it permits simple installation of the cells, pipes, and fins. The arrangement inside the cell stack results in shorter heat-exchange pathways making it possible for interior cells to also be cooled quickly.

The pipe should extend alternately upwards and downwards in the longitudinal direction of the cells, and thus provide more sections running lengthwise on which the fins can be arranged.

Since there are different distances between the battery cells and the allocated pipe section on which the fin of the battery cell is attached, the cells are cooled at different intensities. The fins positioned farther from the pipe are at a disadvantage in this instance because the difference in temperature between the adjacent fin portion and the outer side of the cell housing is less than with the battery cells whose fins or fin sections are positioned closer to the cooled pipe. However, since a minimal temperature difference between the battery cells during charging and discharging is, as previously mentioned, vital to the life span of the batteries, the invention provides for those battery cells that are more distant from the allocated pipe or pipes to contact the fin or fins by means of a greater contact surface, that is to say a greater heat-exchange surface is provided than is found with battery cells arranged more closely to the allocated pipe.

The differing contact surfaces can, for example, be realized in that the fins or the fin sections for the more-closely-positioned battery cells have at least one recess or depression by means of which the contact surface is decreased.

A particular difficulty results with the use of so-called zeotropic coolants. They are mixtures of different liquids with different saturation temperatures. When boiling or vaporizing, the composition of the liquid changes resulting in a change the total saturation temperature of the remaining liquid.

The present invention also makes it possible for zeotropic coolants to be used to cool power train batteries. As previously mentioned, all batteries used to have to be kept at the same temperature if at all possible. The use of a zeotropic coolant runs counter to this aim since the coolant changes its saturation temperature while traveling through the battery assembly and therefore exhibits an increasingly diminished cooling effect.

For this purpose, the invention provides for a power train battery assembly having a plurality of battery cells, each encased in an externally-closed cell housing, that are combined into a cell stack and moreover having at least one pipe conducting a zeotropic coolant for the removal of heat energy from the battery cells. The pipe section positioned within the battery assembly is designed so that the coolant undergoes a decrease in pressure in such a manner that the saturation temperature of the coolant in the pipe section substantially remains constant. The invention compensates for the temperature change in saturation temperature arising for and because of itself by a purposive pressure reduction within the pipe section.

Slight fluctuations of temperature of ±1 K are tolerable and within the range of production fluctuations.

According to the preferred embodiment, the conceived decrease in pressure lies within the range of 0.25 to 0.75 bar.

Possible methods for obtaining a decrease in pressure are, for example, a narrowing, in particular a continuous narrowing, of the cross section of the pipe up to the outlet by means of a reduction of diameter or a flattening of the pipe, for example. In pipe sections connected in series, the number of pipe sections can also achieve a decrease in pressure.

Another solution the invention provides for the use of zeotropic coolants is the use of a plurality of pipe sections conducting a zeotropic coolant within the battery that are in direct thermal contact and are flowed through in a counter-current manner. The temperatures in the pipe sections average themselves out through the counter-current flow in such a manner that a uniform cooling effect is achieved overall.

The pipe sections should preferably run parallel to each other within the battery and should be arranged as close as possible to each other.

A particularly effective temperature compensation results when one or more fins issue from both pipe sections together since it is in the fins themselves that the temperature becomes more uniform.

Figure 6:
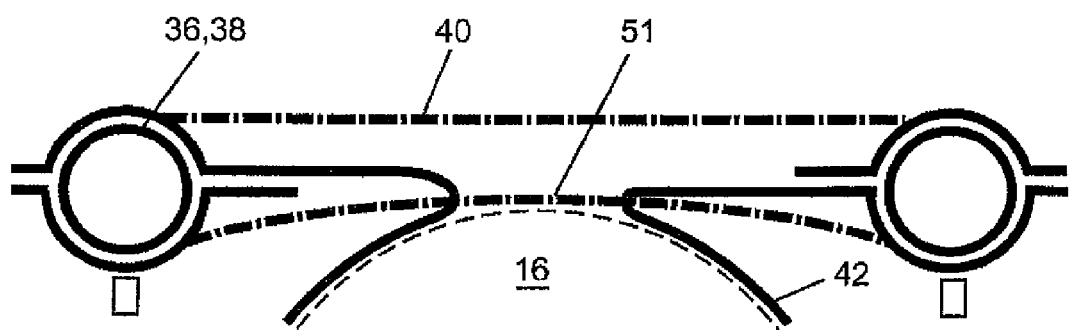
Figure 7:
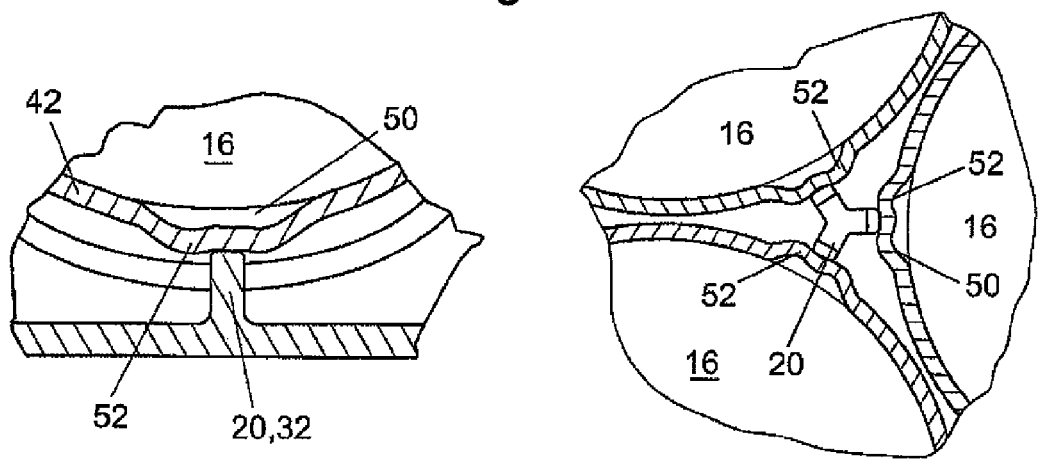

Other features and advantages of the invention can be found in the following description and from the following drawings to which reference is made. The drawings show in FIG. 1 a schematic side view of the floor region of a section of a battery assembly according to the invention, FIG. 2 an enlarged view of the floor region of the outer housing of the assembly according to FIG. 1, FIG. 3 an enlarged view of a somewhat modified assembly in the floor region, FIG. 4 a schematic elevational view of the assembly, according to the invention, with the housing cover removed, FIG. 5 a schematic elevational view of the assembly, according to the invention, according to an additional embodiment, FIG. 6 an enlarged view of the area characterized as X in FIG. 5 and framed by a broken line, FIGS. 7 to 9 different detail views of possibilities for positioning the fins in the housing, FIG. 10 a schematic elevational view of a cell stack which is used in the invention and has an integrated cooling pipe, FIG. 11 a schematic elevational view of an additional cell stack which is used in the invention and has an integrated cooling device, FIGS. 12 to 16 further variants of battery cell stacks with an integrated cooling device, FIG. 17 an enlarged view of a variant for the coupling of fins to the allocated pipe conducting cooling-fluid, FIGS. 18 and 19 an enlarged detail view of two successive manufacturing steps for creating an additional variant for the coupling of fins to the allocated pipe, FIG. 20 a detail view of a pipe that conducts cooling fluid and to which fins are affixed, FIG. 21 a schematic side view of an alternative embodiment of the power train battery assembly according to the invention, FIG. 22 an elevational view of the battery assembly of FIG. 21 with the cover removed, FIG. 23 a schematic elevational view of a cooling device used in the assembly according to the invention, FIGS. 24 to 26 enlarged views in the region of contact between the fins and the battery cells according to different embodiments, FIG. 27 an elevational view of one battery cell enclosed by a fin according to a different variant, FIG. 28 a schematic side view of a unit for manufacturing a coated sheet metal sheet from which the fins used in the assembly according to the invention are manufactured, FIG. 29 an elevational view of the unit according to FIG. 28, FIG. 30 a schematic view of a pipe conducting a zeotropic cooling agent in the area of the assembly, the fins having been omitted for the sake of simplicity, FIG. 31 a side view through the assembly along the cross section A-A in FIG. 30, FIG. 32 a side view through the assembly along the cross section B-B in FIG. 30, FIG. 33 a schematic view of a pipe conducting a zeotropic cooling agent in the area of the battery assembly according to an additional variant of the invention, the fins having been omitted for the sake of simplicity, and FIG. 34 a cross-section view through the assembly in the region of the pipe along the cross section C-C in FIG. 33.

FIG. 1 shows a power train battery assembly of an electric, fuel-cell or hybrid vehicle that is equipped with an active cooling. The outer housing 10 consists of a basin-shaped base body open on one side and a cover that closes base body 12, both base body and cover being manufactured of plastic (PP, PA, PPS or PPA) by means of injection molding. Numerous battery cells 16 are housed in the outer housing 10 and are connected in series in such a manner that a high-voltage battery, more precisely a high-voltage storage battery, is created. The individual battery cells 16 are NiMH- or Li-ion batteries and are self-contained units that are externally closed by an individual cell housing 18. The battery cells are either grouped into a pack in the outer housing 10 prior to assembly or become a pack only upon insertion into the outer housing 10.

The battery cells 16 become positioned in the outer housing by means of the outer housing 10 having interior, integrally formed positioning projections 20. The cells 16 have a cylindrical, in particular a circularly cylindrical, external geometry, it being noted that the positioning projections 20 project into the spaces between adjacent battery cells 16 as is shown in FIGS. 1 to 3. The battery cells 16 are positioned precisely above the positioning projections, which are preferably primarily integrally formed on the floor 22 and on the lid 14, in all directions, that is to say in the direction of the longitudinal axis A of the battery cells 16 and in a radial direction. To achieve this positioning, the positioning projections 20 engage the end faces 24 of the battery cells 16 and the axial edges of the peripheral faces 26. The engagement surface is very minimal in its entirety, with the positioning projections 20 extending only 2 to 20% in the longitudinal direction beyond the entire length of the associated battery cell 16 adjacent thereto. The corresponding length L in the axial direction is represented in FIGS. 2 and 3.

The battery cells 16 have tolerance with respect to the cell housing 18 that should not be disregarded. To ensure that the battery cells 16 are stably fastening in the outer housing 10 without free travel, the positioning projections 20 have sections of differing elasticity. This is shown, for example, in FIG. 2. A first section 28 projects until under the end face 24 and consists of the same material as the portion visible from the outside of the outer housing 10. This first section 28 is relatively hard and stabile and has a receptacle for a cross-sectionally T-shaped second section 30 composed of a rubber-like plastic of minimal elasticity that then abuts the end faces 24 and the peripheral faces 26 of the cell housing 18. Given that the second section 30 is very soft, it contributes to a prestressed, tolerance-equalizing mounting of the battery cells 16. The manufacture of the outer housing 10 with the sections 28, 30 having differing degrees of hardness or differing degrees of elasticity is the result of the so-called two-component injection molding method. For ease of inserting batteries individually or inserting them between a plurality of positioning projections 20, said positioning projections have insertion chamfers that are recognizable in FIG. 3.

Figure 5:
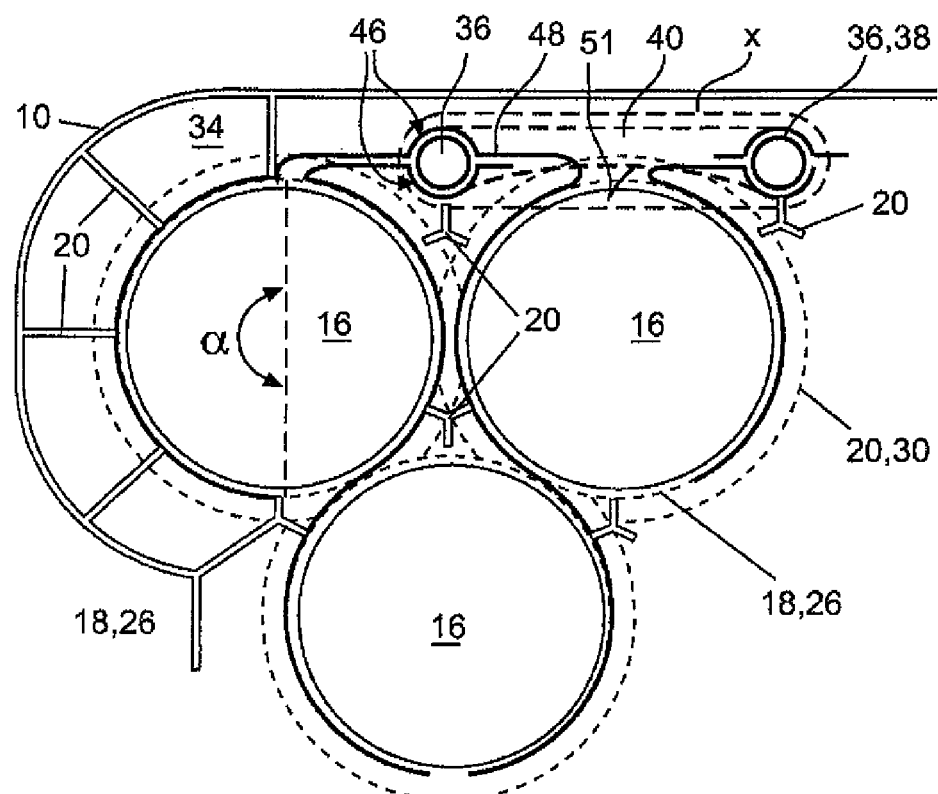

FIG. 5 shows that the positioning projections 20 in part completely encompass the battery cells on the peripheral edges. However, for lateral securing, the peripheries should provide for at least a three-point mounting. In the alternative shown in FIG. 5, the softer, second section 30 runs closed around the adjacent battery cells 16. Additional positioning projections 20 in the form of ribs or star-shaped ridges laterally hold the battery cells 16 from the outside. The outer battery cells in particular abut the rib-shaped positioning projections 20. Star-shaped positioning projections project into the space between adjacent battery cells in such a manner that one positioning projection 20 contributes to holding a plurality of battery cells 16. The positioning projections represented in FIG. 5 in rib- or star-shaped form extend in part over the axial edge of the peripheral faces 26 into the middle sections of the peripheral faces 26 or even extend from the floor 22 to near the lid 14 or, conversely, from the base of the lid 14 to near the base body 12. In oversized battery cells 16, the positioning projections 20 deform as well as the cell housings 18 if need be.

It can also be seen in FIG. 3 that ribs 32 in the region of the floor 22 are integrally formed and thus are intended to increase the stability of the outer housing 10. A thermal insulating layer 34 can be applied, through two-component injection molding or through foaming, between the ribs 22 or, very generally, in certain sections of the outer housing 10.

As previously mentioned, the battery assembly according to the invention possesses an active cooling device, more precisely a cooling circuit. The cooling device consists of one or more pipes 36 that conduct cooling fluid, extend through the outer housing 10, and are connected to a coolant circuit or refrigerant circuit outside the outer housing 10. The cooling fluid can be a water/glycol mixture, R-134a, $CO_2$ or an alternative coolant that passes through the cooling circuit in the corresponding phase stage. The pipe or pipes 36 do not run linearly through the outer housing 10, bur rather in concertina arrangement or in the broadest sense in crenellation arrangement. This means that the pipe 36 has sections 38 running longitudinally to the cell longitudinal axis A (see FIG. 1) and sections 40 running transversely thereto. This course is intended to maximize the pipe length running inside the outer housing 10.

Numerous, thin fins 42 are fastened to pipe 36. The fins 42, which have a wall thickness of only 0.1 to 2.5 mm, preferably 0.5 to 1.5 mm and consist of aluminum, copper or corresponding materials exhibiting high thermal conductivity, conform to the outer shape of the cell housing 18 and lie flat and abut by means of a press fit the peripheral faces 26, that is to say they "hug" said faces. In the manufacture of the fins 42, consideration is given to the fact that their position and geometry are coordinated with battery cells 16 having outer dimensions of the lower limit. This ensures that the fins 42 can always conform to the allocated battery cell 16 and flatly abut it in a prestressed manner if the cell 16 is slid into the corresponding receiving chamber defined by the fin 42 or the plurality of fins 42. The numerous fins are directly affixed to a pipe 36 in order to ensure a favorable heat exchange. The corresponding fins are affixed to their pipe section through adhesive bonding, welding, soldering or a mechanical fastening means. It can be seen in FIGS. 4 and 5 that fins 42 in the area of the pipe 36 are shaped into half shells 46 that abut opposite ends of the pipe 36 and enclose it in a clamp-like manner. This permits the fins 42 to be pressed against the pipe 36 by means of simple bolted or riveted connections 48.

The fins 42 contact at least 40% of the outer peripheral surface, that is to say the peripheral faces 26 of the cell housing 18, in such a manner that the corresponding portion of the peripheral face 26 of the cell housing 18 is covered by one or more fins 42 in order to carry heat away from the battery cells 16 in the direction of the pipes 36.

In the embodiments shown in FIGS. 4 and 5, the individual fins 32 encase over 180° of the circumference of the cell housing 18 (see angle α), when viewed from the direction cell longitudinal axis A, meaning that the fins 32 are affixed to the cell housing 18 in a self-adhering manner. The previously mentioned ribs and ridge-shaped positioning projections 20 also likewise partially abut the fins 42 and additionally support them (see FIG. 5). It is also easily recognizable from the figures that the battery cells 16 are in part clamped between a plurality of fins 42 engaging opposite outer peripheral sections of the cell housing 18. The fins 42 extend in a concertina arrangement along the battery cells 16 in order to contact more battery cells 16.

The fin sections adjacent battery cells 16 may indeed come into contact with each other, as is shown between the lower, two left battery cells 16 in FIG. 4, however it is preferable that a minimal amount of clearance be provided by means of which the tolerances in the outer periphery of the cell housing can be captured. The fins 42 represented there each have a W-shaped area that bulges outward that is spatially distanced from the battery cells 16 (see FIGS. 7 to 9). The corresponding clearance has reference sign 50. The W-shaped section forms a form-fitting retaining section 52 into whose exterior cavity a rib 32 or a positioning projection 20 projects. The flexibility of the fins 42 is retained by means of the gap 50.

Figure 8:
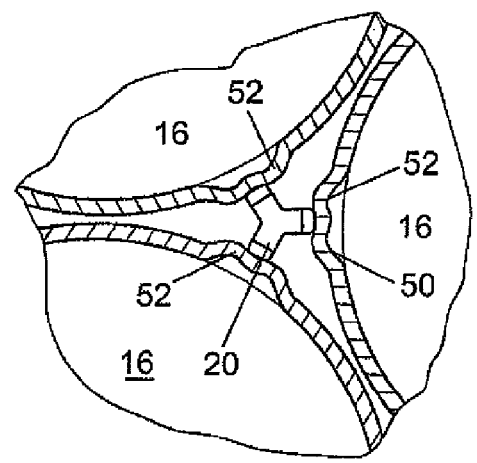

FIG. 8 shows that the star-shaped positioning projection 20 simultaneously positions three adjacent fin sections by means of corresponding retaining sections 52.

Figure 9:
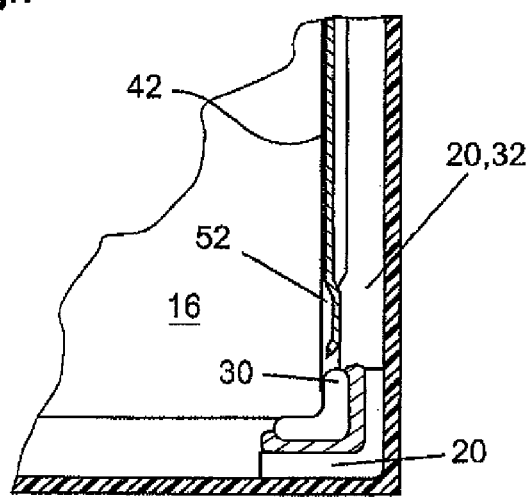

The retaining sections 52 need not also extend over the entire axial length of the fins 42, but rather can position only a small edge or section of the fins 42, as can be seen on the lower edge of the fin 42 shown in FIG. 9.

The pipes 36 can be arranged entirely outside the cell stack or, should there be sufficient space between the battery cells 16, they can run partially or entirely within the corresponding spaces. In the embodiment according to FIGS. 4 to 6, the longitudinally running pipe sections 38 partially project into the cell stack that is defined externally by the so-called "envelope" of the cells. In FIG. 5, the envelope would ostensibly be a "line" that, as a tangent, abuts the sides of the outer battery cells 16 like fabric tightly stretched around the battery pack.

After the longitudinally-running section 38 partially extends into the cell stack and the transversely-running section 40 should not run beneath the lower end face 24 or above the upper end face 24 of the battery cells but rather should laterally bypass them, the pipe 36, otherwise circularly cylindrically designed, is flattened on the one side of the section 40 that runs transversely and is turned towards the corresponding cell 16. The flattened or indented section is designated with reference sign 51. The section 40 that runs transversely thus lies outside the envelope, remains spatially distanced from the battery cells 16, and has a very minimal lateral structure. In this manner, the installation space gained from the sections 38 partially extending into the pack is also not increased in the transversely-running section 40.

Figure 10:
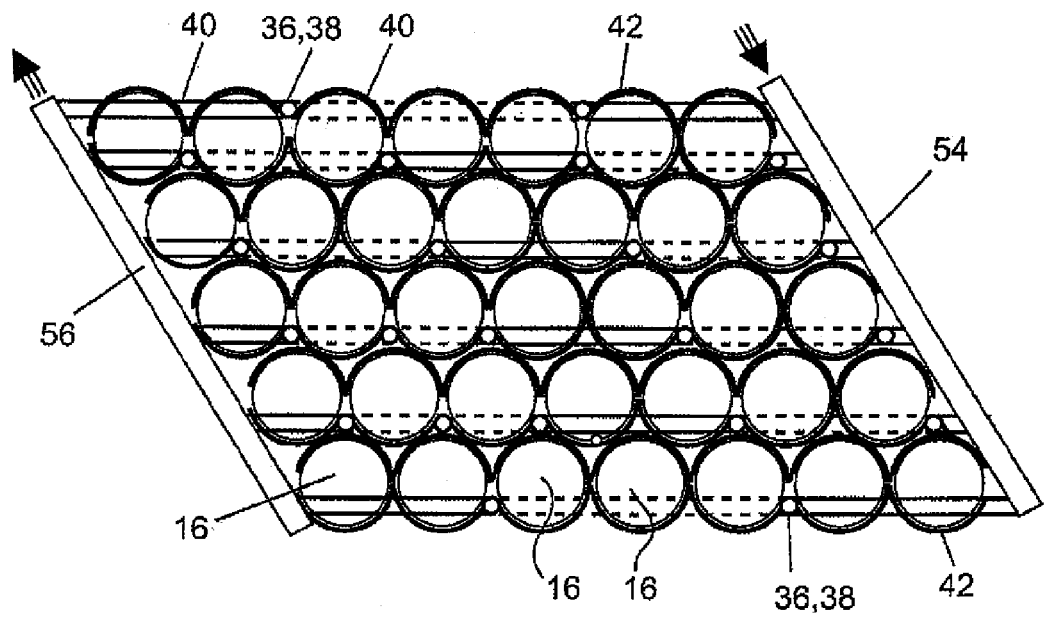
Figure 11:
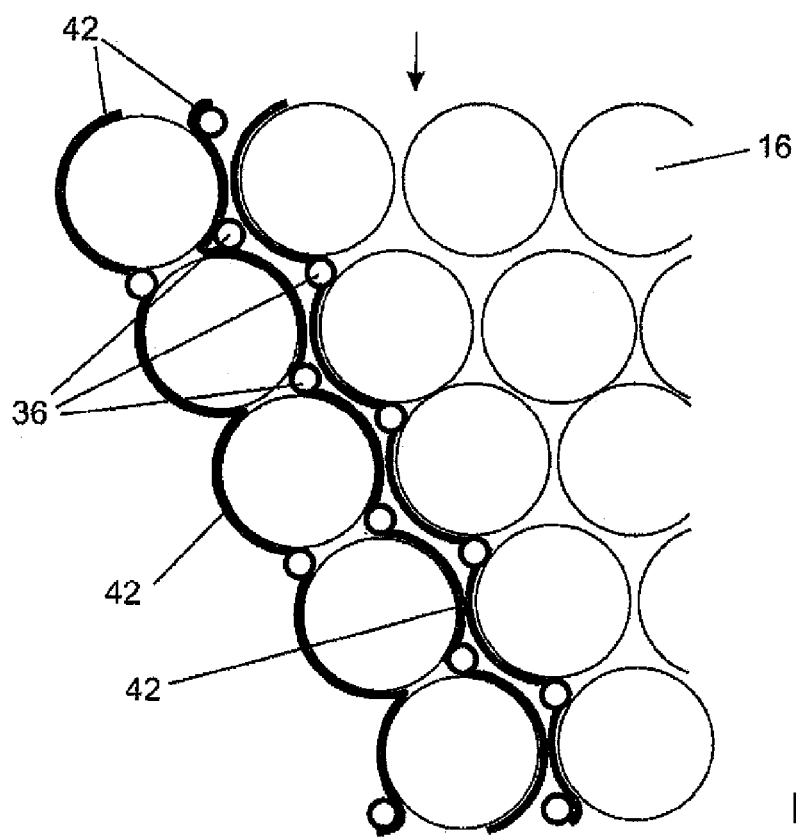

FIGS. 10 and 11 show that pipe 36 or pipe sections can also run entirely within the cell stack. The continuous section of each pipe 36 should make it clear that a section 40 running above the upper end face 24 is concerned, whereas the sections 40 represented by a broken line represent a section 40 running beneath the lower end face 24. The pipes 36 themselves run parallel, for example, and begin at an inlet collector 54 and end at an outlet collector 56. The fins 36 affixed to the pipes 36, or more precisely on the longitudinally-running sections, are represented by thicker lines. In FIGS. 10 and 11, the fins 42 are undulatory and grasp a row of battery cells 16 either on their outer or on their inner surface. The battery cells 16 are thus gripped from opposite surfaces and are extensively contacted in total by the fins 42.

Figure 12:
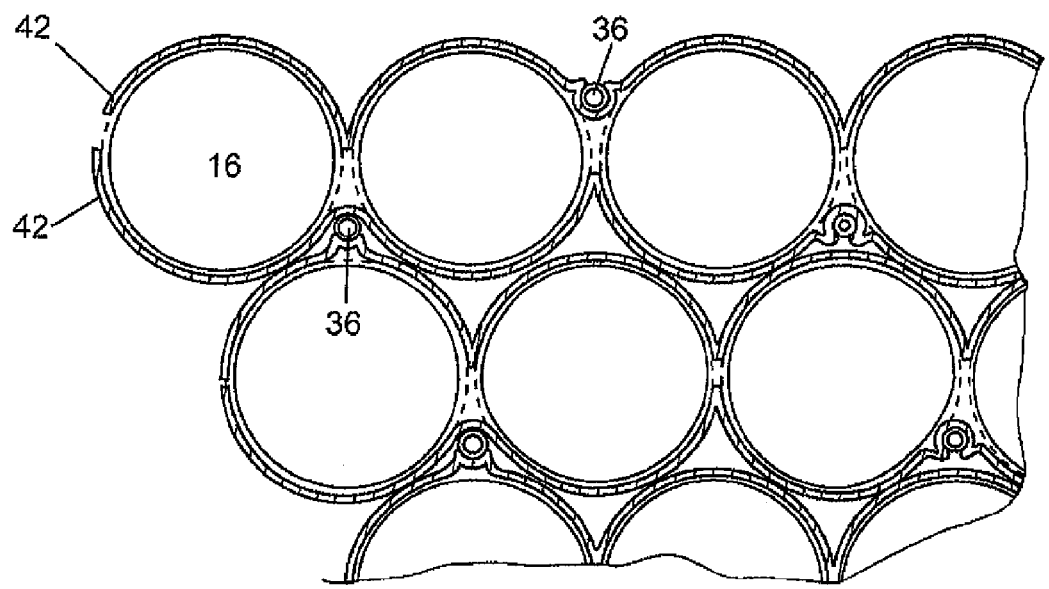
Figure 13:
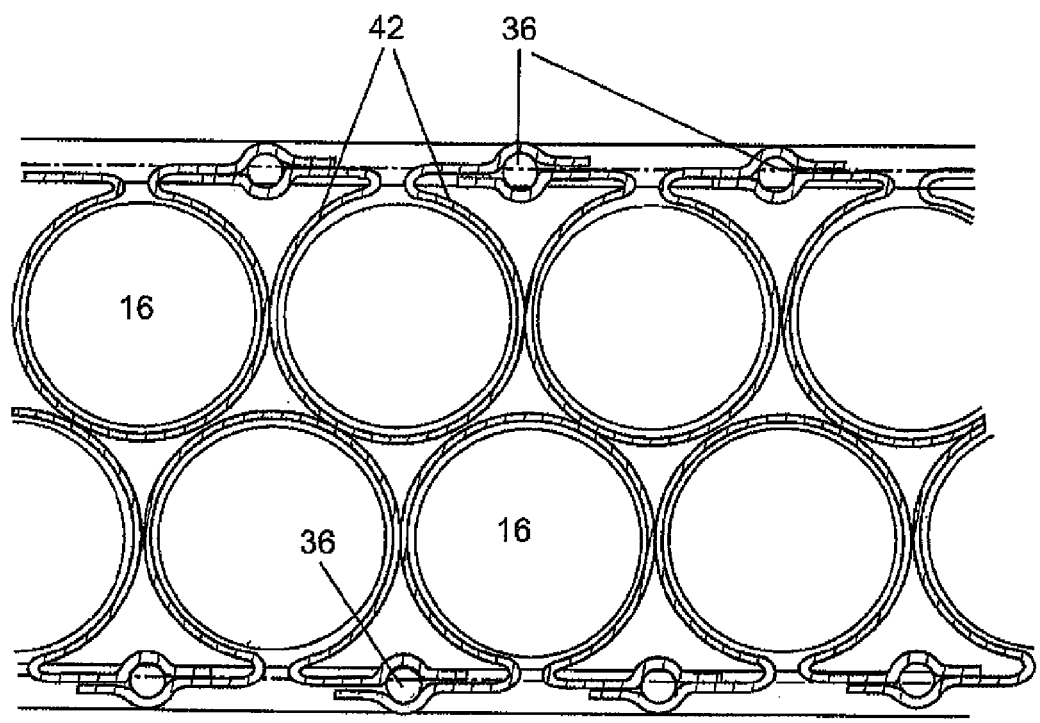
Figure 14:
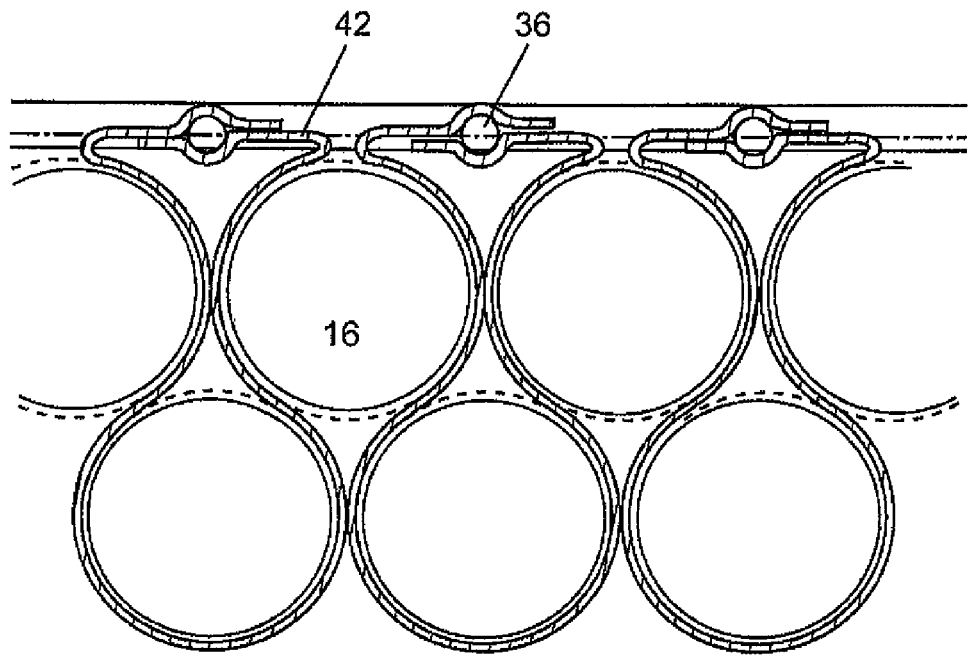
Figure 15:
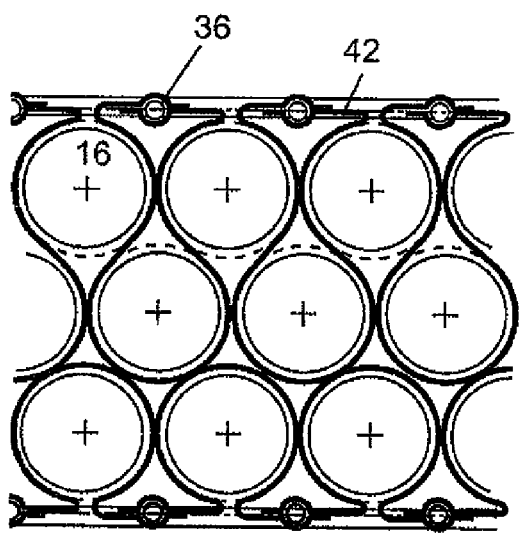
Figure 16:
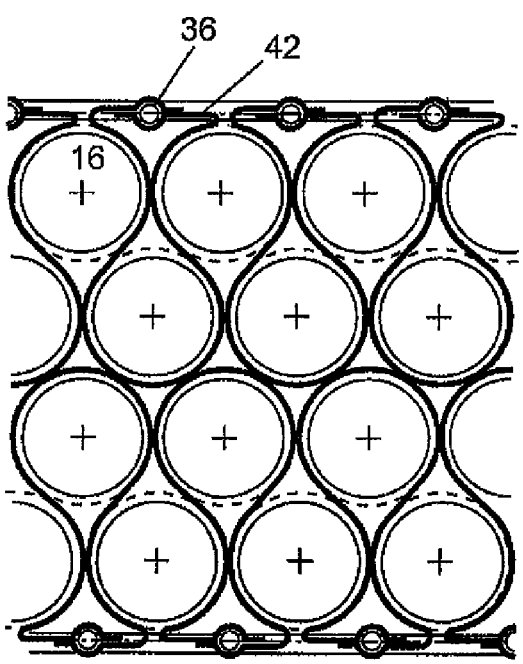

FIGS. 12 to 16 disclose different designs of the fins 42 as well as cell stacks of varying thicknesses. FIGS. 12 and 15 show, for example, a three-rowed cell stack with rows offset from each other, while FIGS. 13 and 14 show a two-rowed cell stack with one external pipe according to FIG. 14 and two external pipes according to FIG. 13, and finally FIG. 16 shows a four-rowed cell stack.

Figure 17:
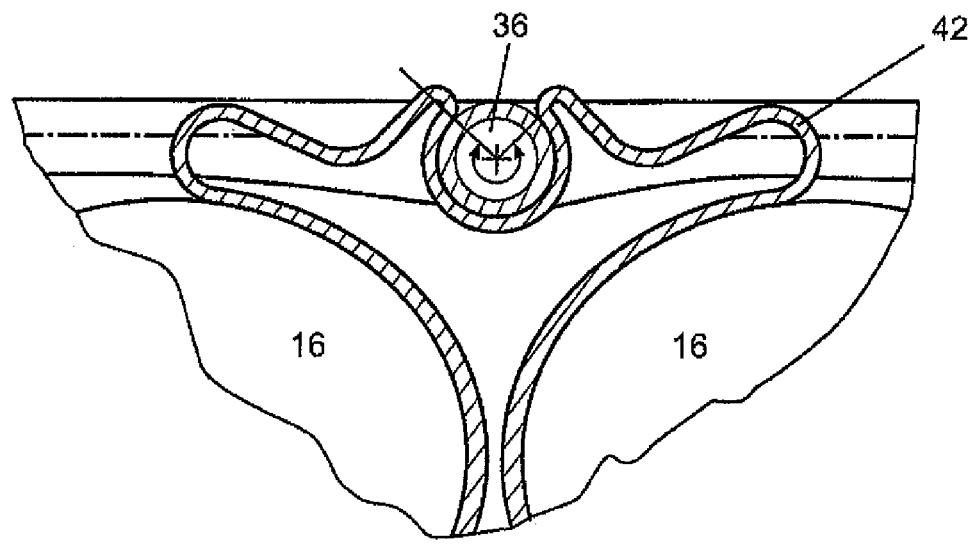
Figures 18, 19:
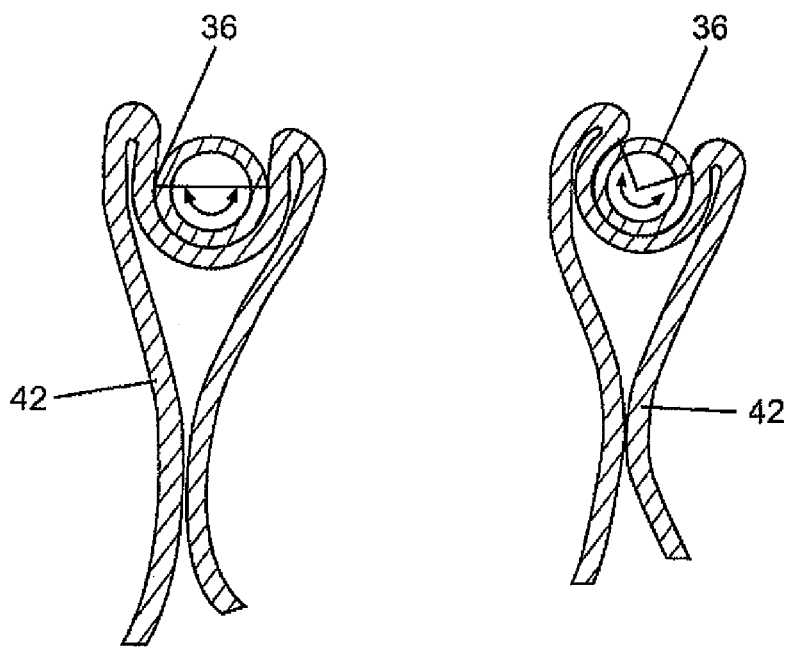

FIGS. 17 to 19 represent different embodiments of how the fins 42 can be designed in the area of connection to the pipe 36.

According to FIG. 17, the middle-section of a fin 42 is substantially shaped to have an Q shape and encloses the pipe 36, from a longitudinal direction, by almost 270°. A press fit is formed between fin 42 and pipe 36, said press fit also ensuring that the fin 42 is well positioned on the pipe 36. Prior to being clipped onto the pipe 36, the fin 42 can already be correspondingly shaped or can be correspondingly crimped around the pipe 36.

FIG. 18 shows a pipe-receiving groove in the mid-section of the fin 42 upon insertion of the pipe 36.

To achieve a press fit between the pipe 36 and the fin 42, the lateral lobes of the pipe-receiving groove are, during a second procedure step, pressed inward toward each other in such a manner that the pipe 36 is held over 270° in a form-fitting manner. In addition to press fitting, soldering or adhering can of course be considered, it being noted that heat-conducting particles such as aluminum preferably be integrated in the adhesive.

The pipes 36 are metal pipes with favorable thermal conductivity of greater than 180 W/m/K and customarily have an outer diameter of 4 to 10 mm, the thickness of the pipe walls being 0.3 to 2 mm depending on the cooling fluid used. The thickness of the walls of the pipes 36 for a water/glycol mixture and for R134a is approximately 0.3 to 1 mm, and 1 to 2 mm for $CO_2$. The inner diameter of the pipes for the for water/glycol mixture and for R134a is 3 to 6 mm, and 1.5 to 4 mm for $CO_2$. One pipe 36 supplies about 1 to 10 battery cells 16, and one fin is assigned to approximately 1 to 3 battery cells 16 and is in contact with them.

Figure 20:
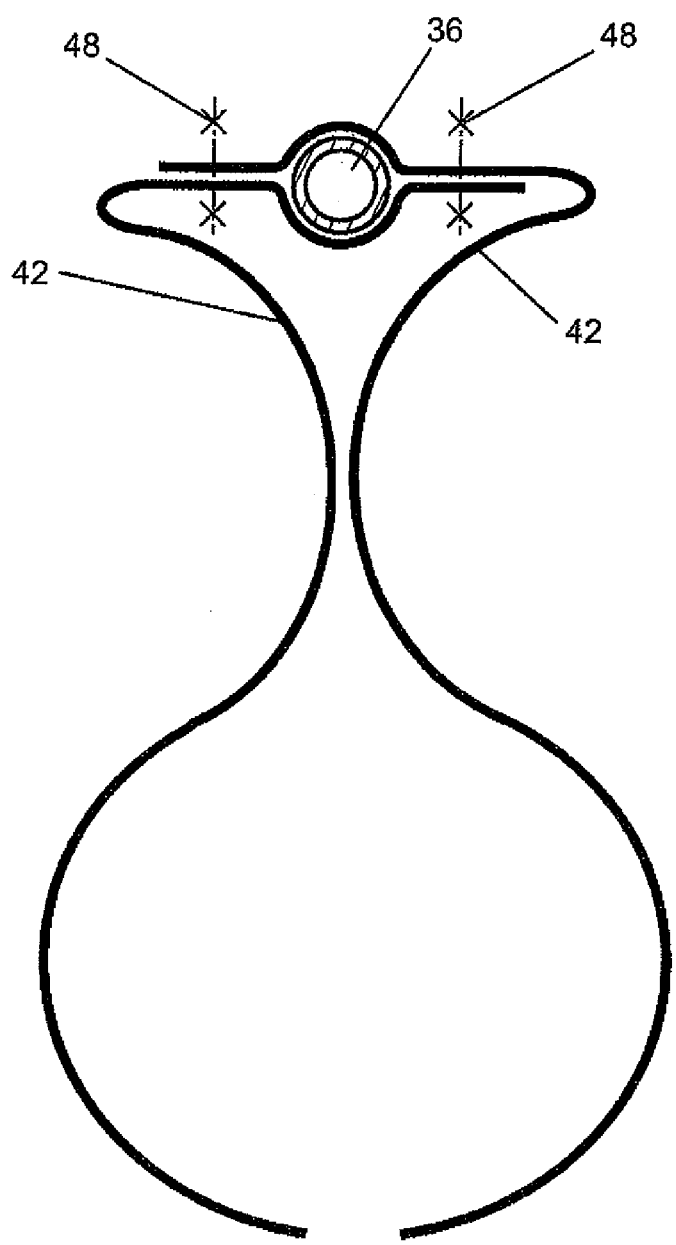

FIG. 20 shows a larger representation than already shown in FIG. 4 of the affixing of two fins 42 to a pipe section by means of a mechanical fastening 48.

Altogether, the execution of the cooling devices permits a modular design for battery assemblies of differing sizes.

The positioning of the pipes 36 themselves can also be very easily effected by means of corresponding positioning projections 20 in the outer housing 10. This can be understood, for example, from looking at the right pipe section 36 represented in FIG. 5, said pipe section between mounted between a positioning projection 20 and the insulating layer 34.

Figure 21:
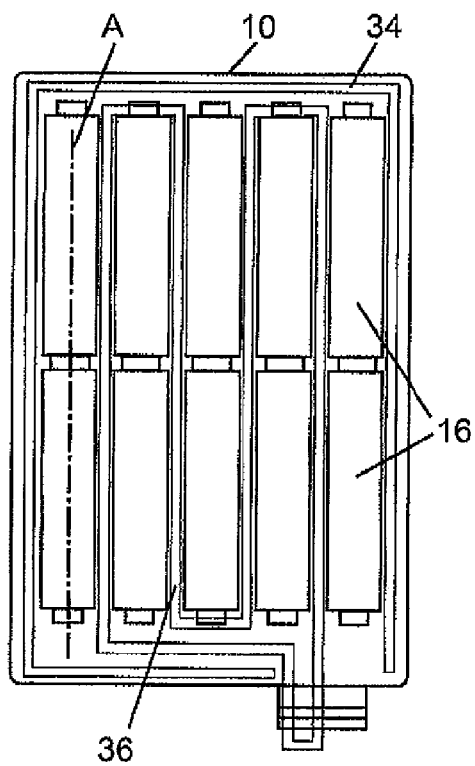
Figure 22:
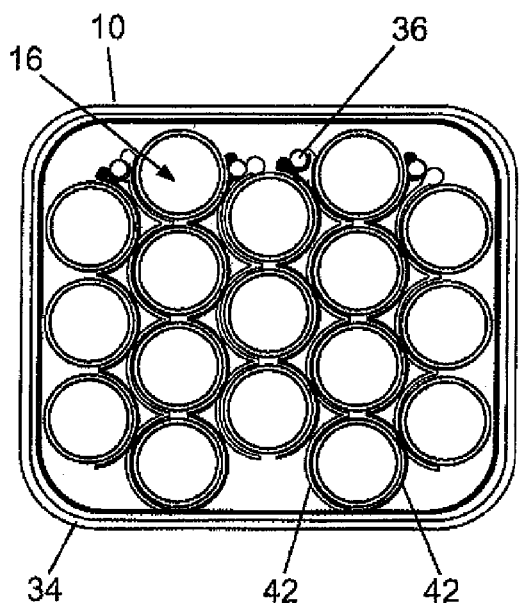

In the embodiment according to FIG. 21, the battery cells 16 are not only arranged adjacent to each other and connected in series by means of contact wires 64 as shown in FIG. 4, but two packs of battery cells, one atop the other, are also combined into one complete pack. The longitudinal axis A of the battery cells 16 align here so that shared spaces aligning with each other exist between the battery cells 16 and provide space for the pipes 36 and the fins 32 (see also FIG. 22).

Figure 23:
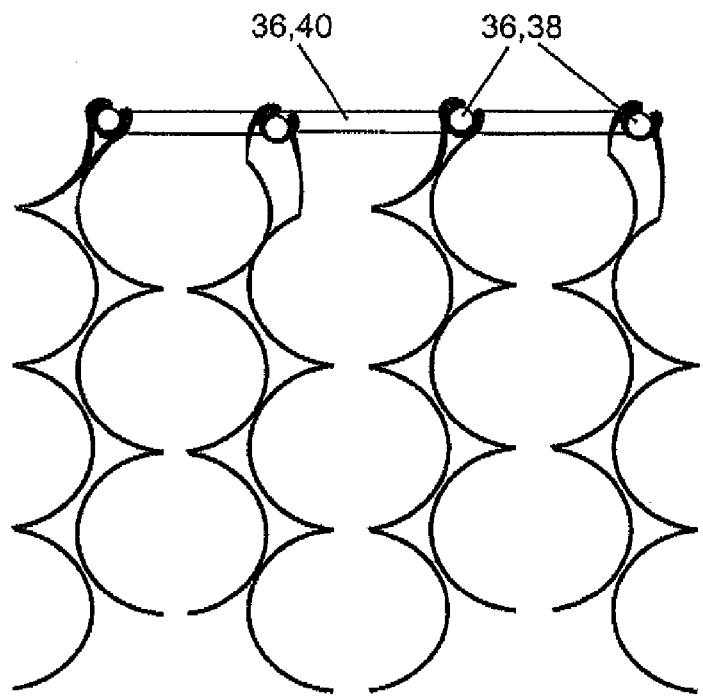

FIG. 23 represents an example of how a cooling device can be entirely preassembled. The sections 38 that run longitudinally in this instance, do not each have two fins 42, for example, that are fastened to the corresponding section 38 and that each abut one side of a row of three adjacent battery cells 16.

Comments on how the assembly is assembled follow. First, the battery cells 16 are placed individually or in groups in the base body 12 and are positioned between positioning projections 20 and ribs 32. The cooling device is mounted parallel thereto, although in a separate assembly tool, the fins 42 having been previously fastened to the already bent pipes 36. In the assembly tool, the fins 42 are bent around so-called "dummies" that simulate the battery cells 16, the dummies having a corresponding minus allowance in order to ensure the subsequent press-fitting of the fins 42. The fins may be entirely pre-shaped in an upstream roll tool or blanking tool so that the fins in the assembly tool are held corresponding only to the basic battery grid dimension, or the shaping of the fins occurs partially or entirely in the assembly tool. The dummies are fitted with a skirting that conically broadens toward the bottom. The skirting receives the upper ends of the battery cells when they are placed on the pre-assembled pack comprising base body 12 and battery cells 16 from above and the skirting precisely centers the battery cells 16. Since the skirting is wider than the battery cells 16, the complete cooling device with the shaped fins 32 facing downward, regardless of the tolerance of the cell housing, can be inserted into the base body 12 during which process the fins 42 are stuck to the cells 16.

To ensure that during charging and discharging the individual battery cells 16 all have approximately the same temperature and are uniformly cooled, the battery cells 16 are contacted, depending on their distance from the allocated pipe 36, to a different extent by the allocated fin or fins 42. The cells 16 arranged closer to the pipe 36 have the advantage that the adjacent fin section, owing to its close proximity to the pipe 36, is cooler than the fin sections more distant from the pipe 36. The contact surfaces of differing sizes is intended to achieve a uniform cooling effect for all battery cells 16 so that their temperatures vary only in the range between ±2 to 3 K.

The differing contact surfaces and thus heat-exchange surfaces are easily and simply realized by means of openings 58 in those fin sections that are positioned closer to the pipe 36 (FIG. 24), by means of cavities 60 for forming an air gap that is intended to be greater than 0.1 mm, preferably greater than 0.5 mm, or by means of fins 42 spatially distanced one from another (see FIG. 26).

Figure 27:
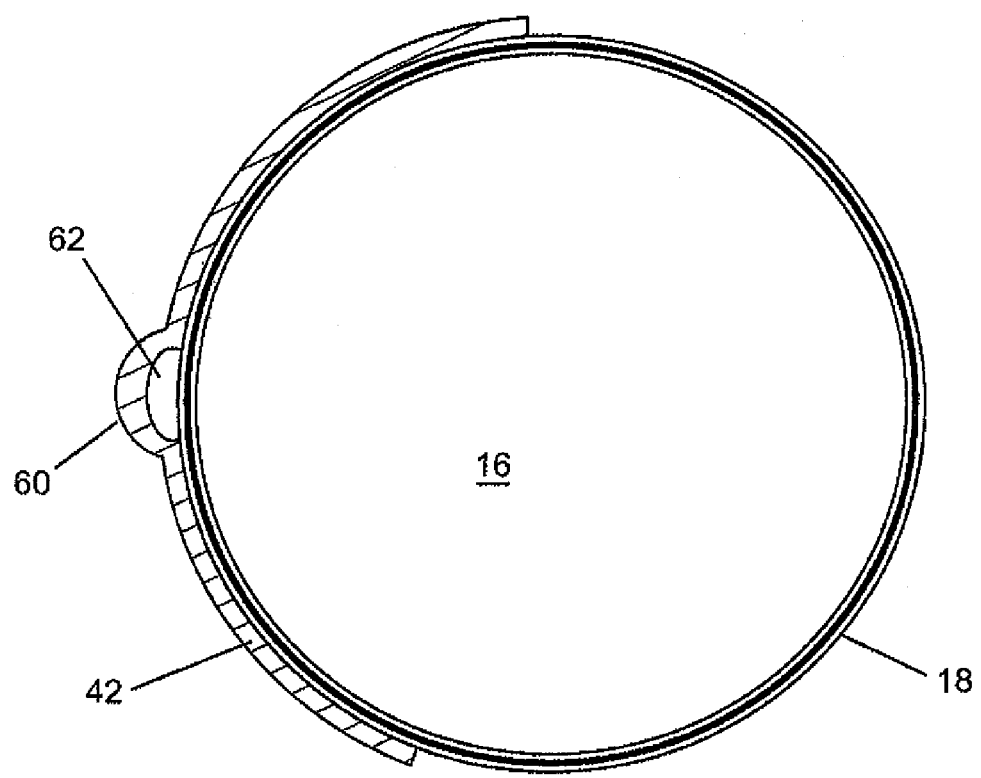

FIG. 27 shows that the cavity 60 can also run alongside the longitudinal axis of the battery and not only alongside the periphery of the battery as shown in FIG. 25. The cavity 60 can also be designed only in a specific location and need not traverse the entire circumference.

Customarily, all of the battery cells 16 that are combined into a battery pack as a finished, preassembled unit are encompassed from their housing outward by an insulating plastic wrapping. This plastic wrapping is fastened onto metal outer housings by means of shrinking. This step naturally requires time and leads to more costly battery cells.

Figure 28:
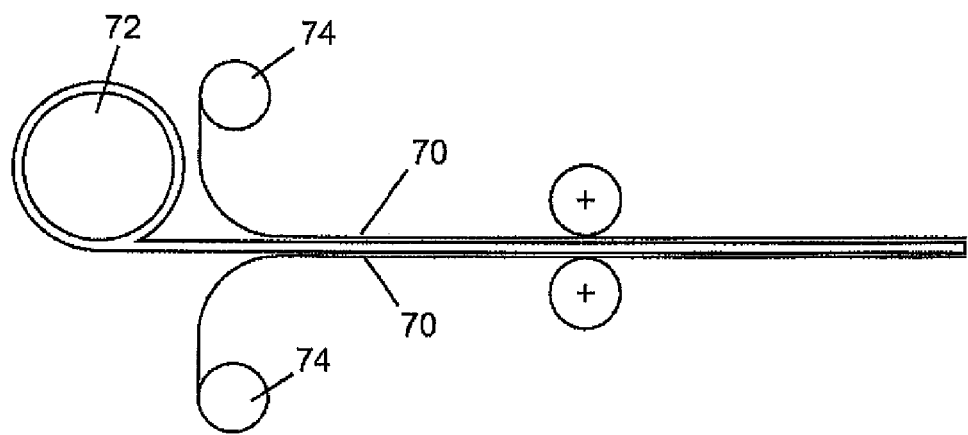
Figure 29:
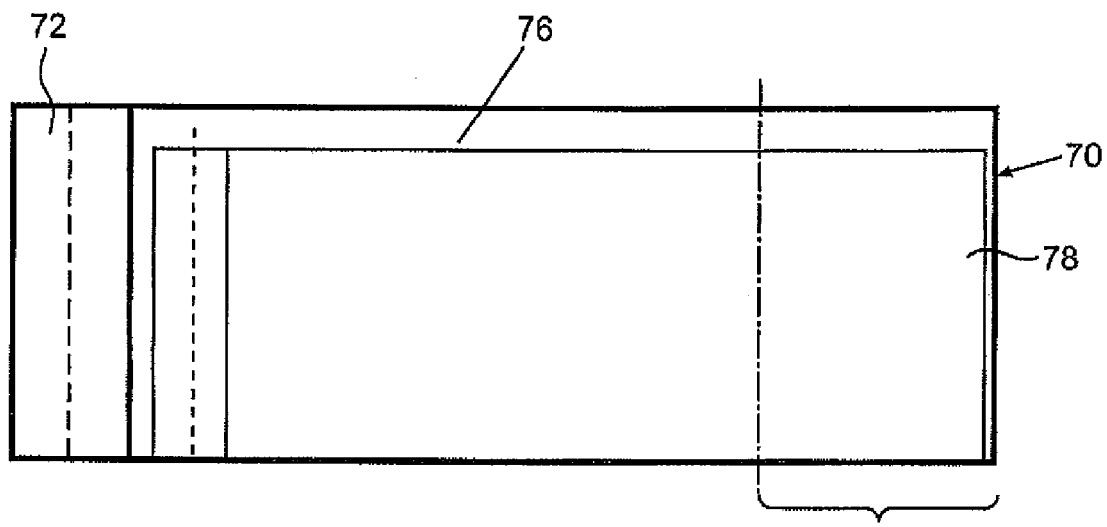

FIGS. 28 and 29 represent a method that reduces the costs for the individual battery cells 16 in an assembly according to the invention.

Namely the battery cells 16 are preferably constructed with only one metal outer housing 18 and have no insulating wrapping composed of plastic. The electrical insulation of the battery cells with regard to each other is effected by the fins 42 that are covered with an insulating layer, also called insulation 70, in the contact area with the metal cell housing 18.

The fin 42 preferably has an insulating layer 70 on both sides, a one-sided insulating layer 70 also being sufficient if need be.

To produce the sheet metal from which fins 42 are cut, the coiled sheet metal coil 72 is uncoiled after production. During the uncoiling process, plastic sheeting coiled on cylinders 74 is simultaneously uncoiled and partially rolled onto one or both sides of the sheet metal. A lined sandwich construction results. The cylinders 74, however, do not have the width of the sheet metal, thereby resulting in a residual non-insulated strip 76. The individual fins 42 are separated from the resulting sandwich strips transverse to the direction of uncoiling (see the dot-and-dash line in FIG. 29). The resulting fins are then fastened to the pipe 36 on the non-insulated strips, while the insulated section 78 serves to contact the battery cells 16 and insulate them.

Figure 30:
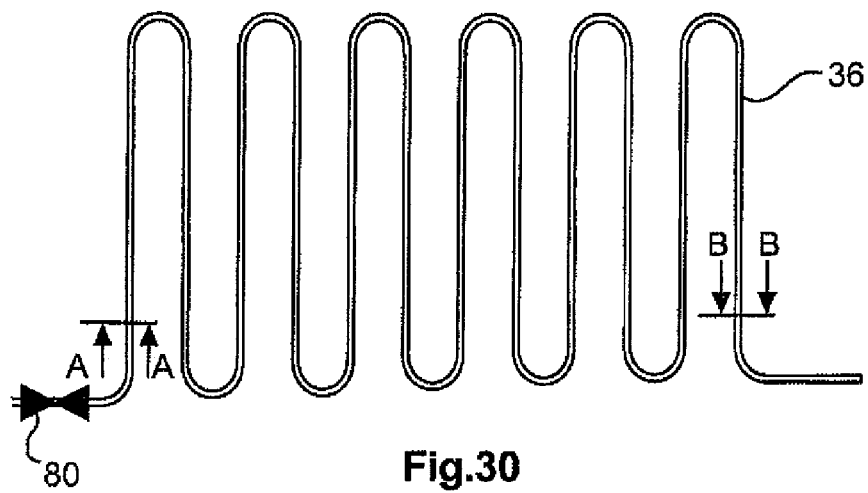

FIG. 30 shows a section, in concertina arrangement, of the pipe 36, said section being arranged within the battery group and conducting a zeotropic coolant. A thermostatic expansion valve 80 is arranged in the inlet region of the pipe 36 in the battery assembly. In the power train assembly, the pipe 36 has a greater cross-section closer to the inlet (see cross-section A-A) than it does in the outlet region (see cross-section B-B). The difference in diameters is selected in order bring about a drop in pressure in the coolant in the area of the shown pipe section. This fall in pressure is so great that the saturation temperature of the coolant in the pipe section remains substantially constant.

Figure 31:
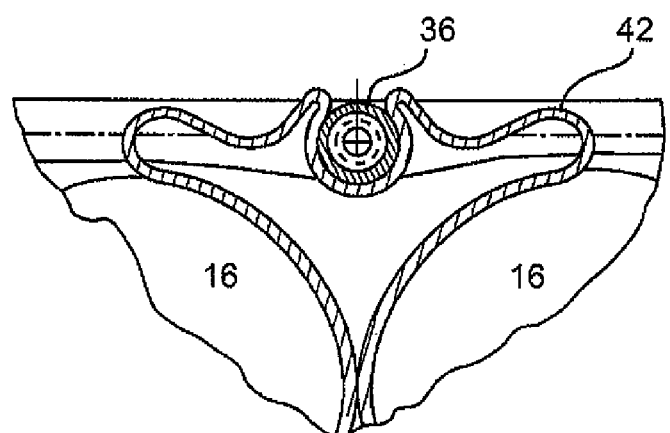

FIG. 31 shows a pipe 38 that is encompassed by a fin 42. The pipe cross-section in the region of cross-section B-B is represented by a broken line. The pipe cross-section can preferably continuously taper in order to maintain a constant saturation temperature truly across the entire length of the pipe section active in the assembly.

Figure 32:
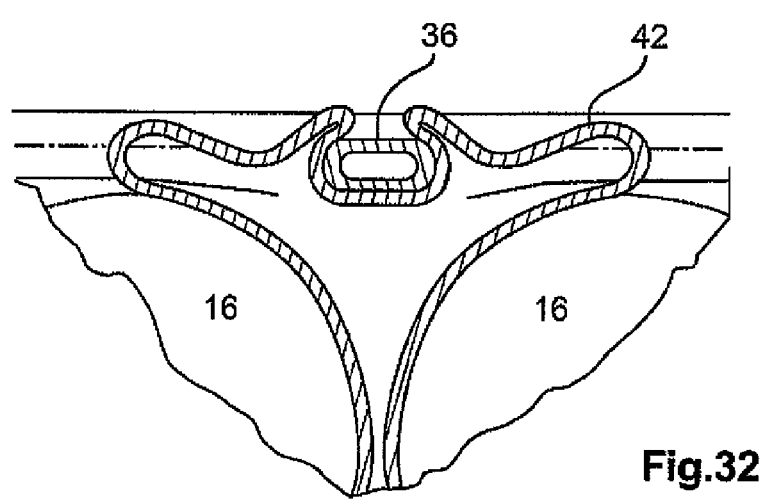

The tapering of the cross section shown in FIG. 31 can be difficult to manufacture; therefore, an alternative, as represented in FIG. 32, has been considered in which the flow diameter of the pipe 38 is changed by altering the pipe by flattening it, for example. By means of just such a flattening, the flow diameter can be particularly easily reduced.

This construction permits a consistent saturation temperature across the entire pipe section.

A similar effect can be achieved by interposing valves such as additional thermostatic expansion valves, for example.

Figure 33:
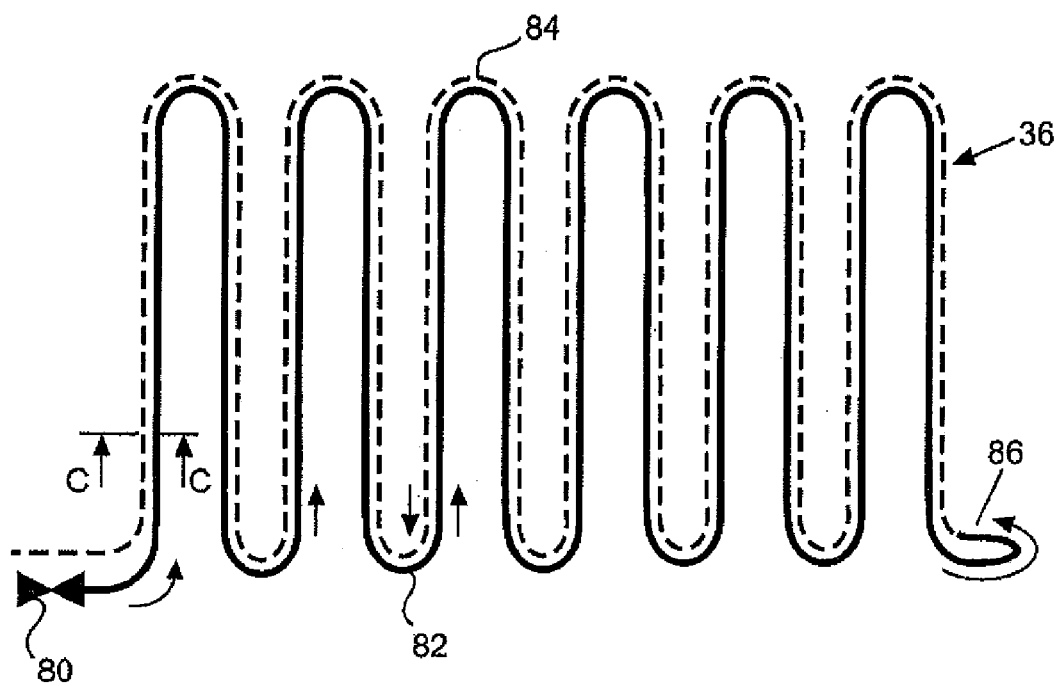

In the embodiment according to FIG. 33, two pipe sections 82, 84 are parallel, are arranged in close proximity to each other, and are formed in a concertina arrangement. The pipe sections 82 (represented with a solid line) and 84 (represented with broken lines) are two directly successive sections of a single pipe 36. At the inlet in the region of the vale 80, the zeotropic coolant flows through the pipe section 82 along the battery cells 16 up to a reversal point 86, from which it flows through the pipe section 84 parallel to and in the opposite direction of the pipe section 82 until it reaches the outlet and flows out of the assembly.

Figure 34:
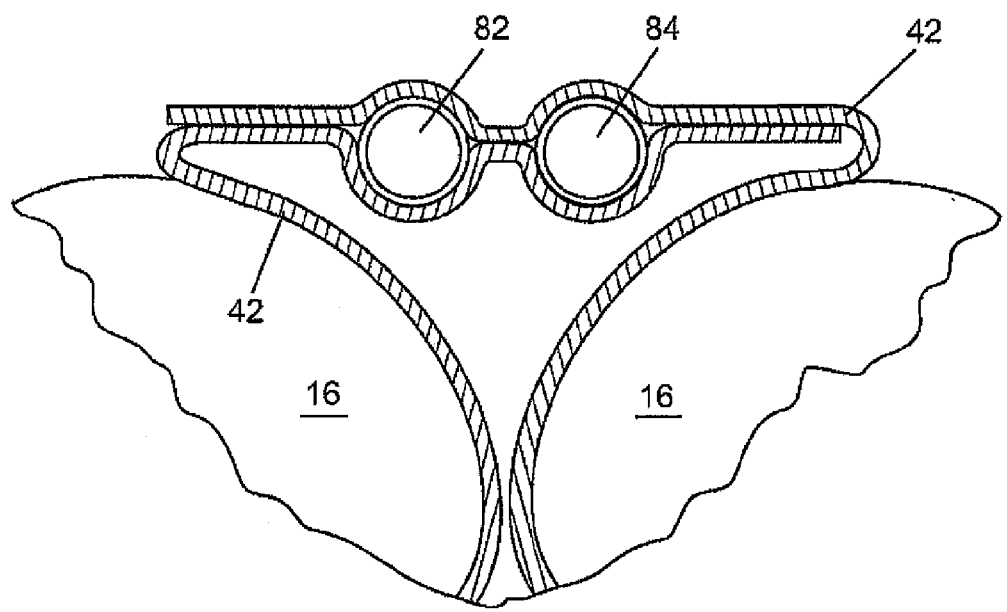

FIG. 34 shows that both pipe sections 82, 84 are arranged in the immediate proximity of each other and thus are in thermal contact with each other. Both pipe sections 82, 84 may also touch each other. Fins 42 encompass both pipe sections 82, 84 in such a manner that the mean of the temperature of the fins results in the area of the battery cells 16 although the saturation temperature of the coolant in the pipe sections 82, 84 differs.

In the embodiments according to FIGS. 30 to 34, the pipes 36 are part of a coolant circuit that is reproduced only in sections.

Instead of two pipe sections 82, 84 of a pipe 36, it is of course also possible for two pipes to be provided which are separate from each other and through which the flow traverses in opposite directions.

The invention claimed is:

1. A power train battery assembly of an electric, fuel-cell or hybrid vehicle, said assembly having:
   an outer housing (10);
   a plurality of cell housings (18) disposed in the outer housing (10);
   a plurality of battery cells (16), one of the battery cells (16) being disposed in one of the cell housings (18), that are combined into a cell stack;
   at least one pipe (36) extending through the outer housing (10) and having an inner wall defining a hollow interior for conducting cooling fluid to remove heat energy from the battery cells (16) and an outer wall opposite the inner wall of the at least one pipe (36) defining at least one laterally reduced cross section (51) abutting at least one of the cell housings (18);
   at least one heat-conducting fin (42) fastened to the outer wall of the pipe (36) and spaced from the cooling fluid with the at least one heat-conducting fin (42) having at least one section flatly abutting at least one of the cell housings (18);
   wherein the outer housing (10) includes a plurality of positioning projections (20) and the battery cells (16) are positioned in the outer housing (10) by the positioning projections (20) such that the battery cells (16) are positioned above the positioning projections (20); and
   wherein the cell housings (18) are circularly cylindrical and the at least one pipe (36) extends at least partially into envelopes of adjacent battery cells (16), with the at least one laterally reduced cross section (51) being positioned outside the envelopes.

2. The power train battery assembly according to claim 1, wherein the at least one heat-conducting fin (42) pushes against the cell housing (18).

3. The power train battery assembly according to claim 1, wherein the at least one heat-conducting fin (42) hugs the cell housing (18) on an outer diameter of the cell housing (18) by means of a press fit.

4. The power train battery assembly as claimed in claim 1, wherein the at least one heat-conducting fin (42) encloses the at least one pipe (36) in sections.

5. The power train battery assembly as claimed in claim 1, wherein the at least one heat-conducting fin (42) is affixed directly to the at least one pipe (36) by means of adhesive bonding, welding, soldering or a mechanical fastening means.

6. The power train battery assembly as claimed claim 1, wherein the at least one heat-conducting fin (42) encompasses the at least one pipe (36) at least partially by forming a press fit in order to be fastened to the at least one pipe (36).

7. The power train battery assembly as claimed in claim 1, wherein the battery cells (16) have a longitudinal axis and, the at least one heat-conducting fin (42), from the direction of the longitudinal axis (A), abuts more than 90° of the circumference of the cell housing (18).

8. The power train battery assembly as claimed in claim 1, wherein at least 40% of the outer circumference of the cell housing (18) should be in contact with the at least one heat-conducting fin (42).

9. The power train battery assembly as claimed in claim 1, wherein the battery cells (16) are clamped between a plurality of heat-conducting fins (42) that engage opposed sections of the outer circumference of the cell housing (18).

10. The power train battery assembly as claimed in claim 1, wherein the cell housings (18) are cylindrical, and the heat-conducting fins (42) extend along the battery cells (16) of differing rows in a concertina arrangement.

11. The power train battery assembly as claimed in claim 1, wherein the fin sections of neighboring battery cells (16) do not come into contact with each other.

12. The power train battery assembly as claimed in claim 1, wherein the battery cells (16) are each encased in the cell housings (18), which is externally-closed as well as having the at least one pipe (36) which conducts cooling fluid.

13. The power train battery assembly according to claim 1, wherein beyond the at least one laterally reduced cross section (51) thereof, the at least one pipe (36) has a circularly cylindrical cross section.

14. The power train battery assembly according to claim 1, wherein the at least one pipe (36) has at least one section (38, 40) that runs alongside the longitudinal axis (A) of the battery cells (16) and that runs transversely to the longitudinal axis (A) of the battery cells (16), and also in that the transversely-running section (40) has the at least one laterally reduced cross section (51) abutting the cell housing (18).

15. The power train battery assembly as claimed in claim 1, wherein the area of the at least one pipe (36) to which the battery cells (16) are attached extends on the outer edge of the cell stack.

16. The power train battery assembly as claimed in claim 1, wherein the at least one pipe (36) extends alternately upwards and downwards in the longitudinal axis (A) of the battery cells (16).

17. The power train battery assembly as claimed in claim 1, wherein the at least one heat-conducting fin (42) is provided with an electrical insulation (70) at least in the area of contact with the cell housing (18).

18. The power train battery assembly according to claim 17, wherein the insulation (70) is created by coating the at least one heat-conducting fin (42).

19. The power train battery assembly according to claim 17, wherein the at least one heat-conducting fin (42) in the area of contact with the at least one pipe (36) is designed without insulation.

20. The power train battery assembly as claimed in claim 17, wherein the insulation (70) is applied by rolling or lining.

21. The power train battery assembly as claimed in claim 17, wherein prefabricated cell housings (18) are designed without external insulation (70) and the at least one heat-conducting fin (42) electrically insulate adjacent battery cells (16) from each other.

22. A power train battery assembly of an electric, fuel-cell or hybrid vehicle, said assembly having:
   an outer housing (10);
   a plurality of cell housings (18) disposed in the outer housing (10);
   a plurality of battery cells (16), one of the battery cells (16) being disposed in one of the cell housings (18), that are combined into a cell stack;
   at least one pipe (36) extending through the outer housing (10) and having an inner wall defining a hollow interior for conducting cooling fluid to remove heat energy from the battery cells (16) and an outer wall opposite the inner wall of the at least one pipe (36) defining at least one laterally reduced cross section (51) abutting at least one of the cell housings (18);
   at least one heat-conducting fin (42) fastened to the outer wall of the at least one pipe (36) and spaced from the cooling fluid with the heat-conducting fin (42) having at least one section flatly abutting at least one of the cell housings (18);
   wherein the outer housing (10) includes a plurality of positioning projections (20) and the battery cells (16) are positioned in the outer housing (10) by the positioning projections (20) such that the battery cells (16) are positioned above the positioning projections (20);
   wherein the exteriors of battery cells (16) are in contact with the associated fins (42) to varying degrees; and
   wherein a contact surface between the fins (42) and the battery cells (16) arranged closer to the at least one pipe (36) is smaller than a contact surface between the fins (42) and the battery cells (16) arranged at a greater distance from the at least one pipe (36).

23. A power train battery assembly of an electric, fuel-cell or hybrid vehicle, said assembly having:
   an outer housing (10);
   a plurality of cell housings (18) disposed in the outer housing (10);
   a plurality of battery cells (16), one of the battery cells (16) being disposed in one of the cell housings (18), that are combined into a cell stack;
   at least one pipe (36) extending through the outer housing (10) and having an inner wall defining a hollow interior for conducting cooling fluid to remove heat energy from the battery cells (16) and an outer wall opposite the inner wall of the at least one pipe (36) defining at least one laterally reduced cross section (51) abutting at least one of the cell housings (18);
   at least one heat-conducting fin (42) fastened to the outer wall of the at least one pipe (36) and spaced from the cooling fluid with the heat-conducting fin (42) having at least one section flatly abutting at least one of the cell housings (18);
   wherein the outer housing (10) includes a plurality of positioning projections (20) and the battery cells (16) are positioned in the outer housing (10) by the positioning projections (20) such that the battery cells (16) are positioned above the positioning projections (20);
   wherein the exteriors of battery cells (16) are in contact with the associated fins (42) to varying degrees; and
   wherein the fin (42) in the area of the cell housing (18) has at least one recess (58) or depression (60) in order to decrease the contact surface.

24. A power train battery assembly of an electric, fuel-cell or hybrid vehicle, said assembly having:

an outer housing (10);

a plurality of cell housings (18) disposed in the outer housing (10);

a plurality of battery cells (16), one of said battery cells (16) being disposed in one of said cell housings (18), that are combined into a cell stack (16);

at least one pipe (36) extending through the outer housing (10) and having an inner wall defining a hollow interior for conducting a zeotropic coolant to remove heat energy from the battery cells (16) and an outer wall opposite the inner wall of the at least one pipe (36) defining at least one laterally reduced cross section (51) abutting at least one of the cell housings (18);

wherein the at least one pipe (36) is positioned within the assembly and designed so that the coolant therein undergoes a decrease in pressure in such a manner that the saturation temperature of the coolant in the pipe substantially remains constant;

wherein the outer housing (10) includes a plurality of positioning projections (20) having sections of different elasticity and the battery cells (16) are positioned in the outer housing (10) by the positioning projections (20) such that the battery cells (16) are positioned above the positioning projections (20)); and wherein the cell housings (18) are circularly cylindrical and the at least one pipe (36) extends at least partially into envelopes of adjacent battery cells (16), with the at least one laterally reduced cross section (51) being positioned outside the envelopes.

25. The power train battery assembly according to claim 24, wherein the decrease in pressure is between 0.25 to 0.75 bar.

26. The power train battery assembly according to claim 24, wherein the decrease in pressure is achieved by narrowing the pipe cross-section in the downstream direction.

* * * * *